US012620393B2

(12) United States Patent
Anwar Batcha et al.

(10) Patent No.: US 12,620,393 B2
(45) Date of Patent: May 5, 2026

(54) TECHNOLOGIES FOR LEVERAGING MACHINE LEARNING TO PREDICT EMPATHY FOR IMPROVED CONTACT CENTER INTERACTIONS

(71) Applicant: Genesys Cloud Services, Inc., Menlo Park, CA (US)

(72) Inventors: Mohamed Uvaiz Anwar Batcha, Chennai (IN); Monisha Padmavathi Ragavan, Chennai (TN); Praveen Kumar Anandadoss, Chennai (IN); Asmitha Durairaj, Chennai (IN); Vinoth Subramaniam, Chennai (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 97 days.

(21) Appl. No.: 18/480,039

(22) Filed: Oct. 3, 2023

(65) Prior Publication Data

US 2025/0111846 A1       Apr. 3, 2025

(51) Int. Cl.
*G10L 15/18*       (2013.01)
*G10L 15/16*       (2006.01)
*H04M 3/51*       (2006.01)
(52) U.S. Cl.
CPC .......... *G10L 15/1815* (2013.01); *G10L 15/16* (2013.01); *H04M 3/5183* (2013.01)
(58) Field of Classification Search
None
See application file for complete search history.

(56) References Cited

U.S. PATENT DOCUMENTS

| | | | |
|---|---|---|---|
| 10,645,225 B1 | 5/2020 | Stoops et al. | |
| 10,671,941 B1 * | 6/2020 | Karp ....................... | G06F 40/30 |
| 10,728,393 B2 | 7/2020 | Eftekhari et al. | |
| 11,134,152 B2 | 9/2021 | McGann et al. | |
| 11,134,153 B2 | 9/2021 | Mcgann et al. | |
| 11,245,793 B2 | 2/2022 | McGann et al. | |
| 11,902,468 B1 * | 2/2024 | Rolinson ............. | H04M 3/5175 |

(Continued)

OTHER PUBLICATIONS

Conversational AI Chatbot Capabilities, https://www.genesys.com/capabilities/chatbots, 6 pages.

(Continued)

*Primary Examiner* — Nafiz E Hoque
(74) *Attorney, Agent, or Firm* — Taft Stettinius & Hollister LLP

(57)       ABSTRACT

A method of leveraging machine learning to predict empathy for improved contact center interactions according to an embodiment includes receiving, by a computing system, at least one user message from a real-time contact center interaction with a user, generating, by an artificial intelligence system of the computing system, at least one empathy score based on the at least one message using the machine learning, wherein each of the at least one empathy score is indicative of a real-time empathy of the user, generating, by the artificial intelligence system of the computing system, an empathetic text response to the at least one user message based on the at least one empathy score, and responding to the at least one user message in the real-time contact center interaction based on the empathetic text response generated by the artificial intelligence system of the computing system.

13 Claims, 10 Drawing Sheets

(56) References Cited

U.S. PATENT DOCUMENTS

| | | | |
|---|---|---|---|
| 12,333,247 B1 * | 6/2025 | Gaidylo | ............... G06F 40/253 |
| 2015/0294595 A1 | 10/2015 | Hu et al. | |
| 2019/0245973 A1 | 8/2019 | Dwyer et al. | |
| 2019/0266999 A1 | 8/2019 | Chandrasekaran et al. | |
| 2021/0334472 A1 * | 10/2021 | Shah | ....................... G06F 40/30 |

OTHER PUBLICATIONS

About Genesys Dialog Engine, https://help.mypurecloud.com/articles/about-genesys-dialog-engine/, 2 pages.

Agent Assist, https://www.genesys.com/capabilities/agent-assist, 7 pages.

About Genesys Agent Assist, https://help.mypurecloud.com/articles/about-genesys-agent-assist/, 2 pages.

RoBERTa: A Robustly Optimized BERT Pretraining Approach, https://arxiv.org/abs/1907.11692, 4 pages.

About messaging, https://help.mypurecloud.com/articles/about-messaging/, 2 pages.

* cited by examiner

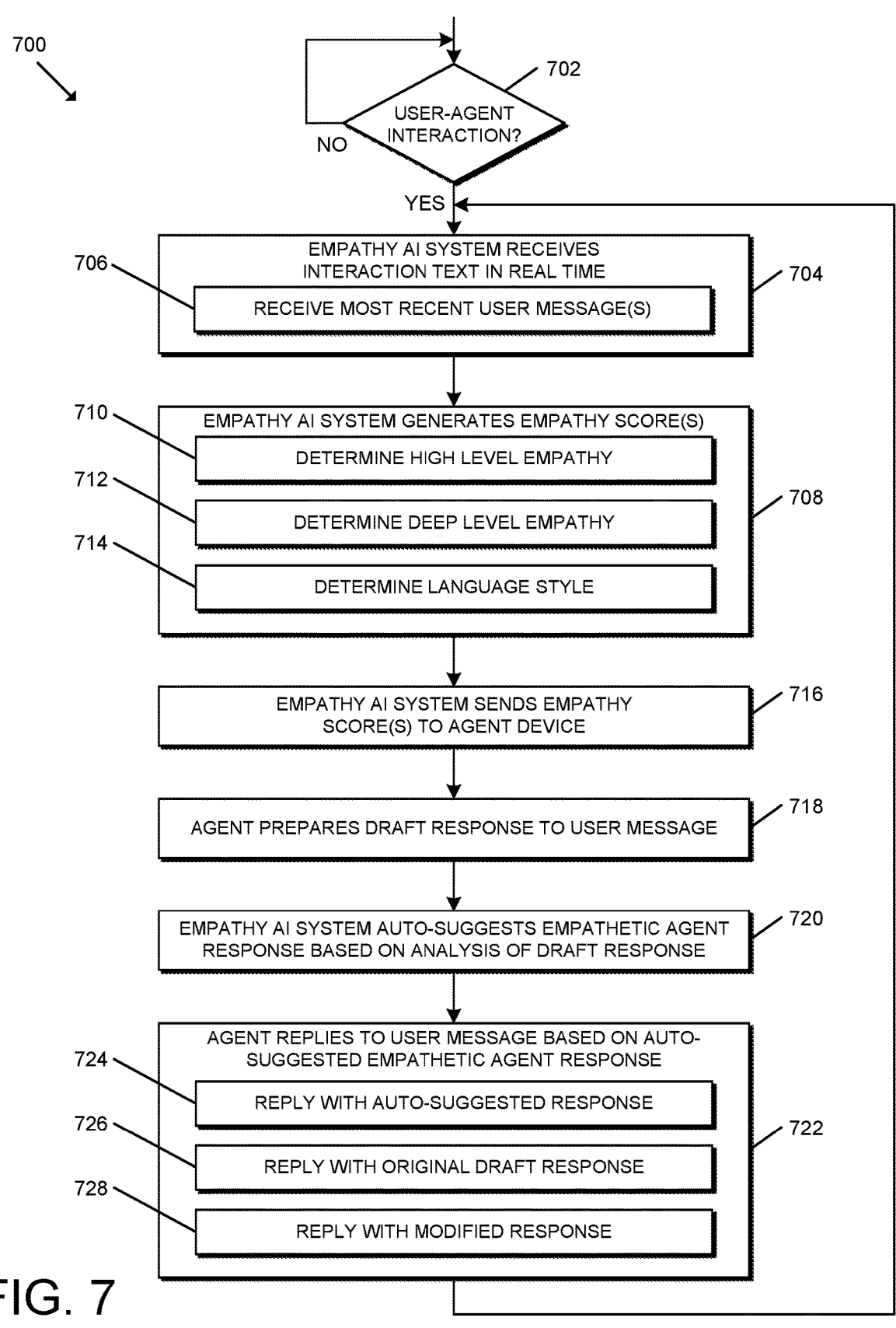

700

702

USER-AGENT
INTERACTION?

NO

YES

706

EMPATHY AI SYSTEM RECEIVES
INTERACTION TEXT IN REAL TIME

RECEIVE MOST RECENT USER MESSAGE(S)

704

710

EMPATHY AI SYSTEM GENERATES EMPATHY SCORE(S)

DETERMINE HIGH LEVEL EMPATHY

712

DETERMINE DEEP LEVEL EMPATHY

708

714

DETERMINE LANGUAGE STYLE

EMPATHY AI SYSTEM SENDS EMPATHY
SCORE(S) TO AGENT DEVICE

716

AGENT PREPARES DRAFT RESPONSE TO USER MESSAGE

718

EMPATHY AI SYSTEM AUTO-SUGGESTS EMPATHETIC AGENT
RESPONSE BASED ON ANALYSIS OF DRAFT RESPONSE

720

AGENT REPLIES TO USER MESSAGE BASED ON AUTO-
SUGGESTED EMPATHETIC AGENT RESPONSE

724

REPLY WITH AUTO-SUGGESTED RESPONSE

726

REPLY WITH ORIGINAL DRAFT RESPONSE

722

728

REPLY WITH MODIFIED RESPONSE

FIG. 7

TECHNOLOGIES FOR LEVERAGING MACHINE LEARNING TO PREDICT EMPATHY FOR IMPROVED CONTACT CENTER INTERACTIONS

BACKGROUND

Call centers and other contact centers are used by many organizations to provide technical and other support to their end users. The end user may interact with human and/or virtual agents of the contact center by establishing electronic communications via one or more communication technologies including, for example, telephone, email, web chat, Short Message Service (SMS), dedicated software application(s), and/or other technologies. Contact center agents may rely on knowledge bases and/or other resources in order to answer questions posed by end users, and expectations are now higher than ever for improved user experiences with contact centers. Although contact centers have traditionally measured user experience based on efficiency (i.e., doing things quickly) and effectiveness (i.e., doing things well), in today's world, efficiency and effectiveness are no longer enough to satisfy the ever-increasing expectations of contact center users.

SUMMARY

One embodiment is directed to a unique system, components, and methods for leveraging machine learning to predict empathy for improved contact center interactions. Other embodiments are directed to apparatuses, systems, devices, hardware, methods, and combinations thereof for leveraging machine learning to predict empathy for improved contact center interactions.

According to an embodiment, a method of leveraging machine learning to predict empathy for improved contact center interactions may include receiving, by a computing system, at least one user message from a real-time contact center interaction with a user, generating, by an artificial intelligence system of the computing system, at least one empathy score based on the at least one message using the machine learning, wherein each of the at least one empathy score is indicative of a real-time empathy of the user, generating, by the artificial intelligence system of the computing system, an empathetic text response to the at least one user message based on the at least one empathy score, and responding to the at least one user message in the real-time contact center interaction based on the empathetic text response generated by the artificial intelligence system of the computing system.

In some embodiments, the real-time contact center interaction with the user may be a real-time contact center interaction between the user and a chatbot of the contact center.

In some embodiments, responding to the at least one user message in the real-time contact center interaction may include responding with the empathetic text response via the chatbot.

In some embodiments, the method may further include transferring the real-time contact center interaction with the user to a contact center agent, notifying the artificial intelligence system of the computing system that the real-time contact center interaction is transferred to the contact center agent, and transmitting the at least one empathy score to an agent device of the contact center agent.

In some embodiments, generating the at least one empathy score based on the at least one message using the machine learning may include determining a high level empathy of the user.

In some embodiments, generating the at least one empathy score based on the at least one message using the machine learning may include determining a deep level empathy of the user.

In some embodiments, determining the deep level empathy of the user may include selecting a deep level empathy of the user from a group of at least ten different categories of deep level empathies.

In some embodiments, determining the deep level empathy of the user may include selecting a deep level empathy of the user from a group of deep level empathies consisting of sentimental, afraid, proud, faithful, terrified, jealous, grateful, prepared, embarrassed, excited, annoyed, lonely, ashamed, guilty, surprised, nostalgic, confident, furious, disappointed, caring, trusting, disgusted, anticipating, anxious, hopeful, impressed, apprehensive, and devastated.

In some embodiments, generating the at least one empathy score based on the at least one message using the machine learning may include determining a language style of the user.

In some embodiments, the real-time contact center interaction with the user may be a real-time contact center interaction between the user and a contact center agent, and the method may further include receiving, by the computing system, a draft agent response to the at least one user message by the contact center agent, and auto-suggesting, by the artificial intelligence system of the computing system, an empathetic agent response to the at least one user message based on the draft agent response and the at least one empathy score.

In some embodiments, the method may further include replying, via an agent device of the contact center agent, to the at least one user message based on the empathetic agent response auto-suggested by the artificial intelligence system of the computing system.

According to another embodiment, a system for leveraging machine learning to predict empathy for improved contact center interactions may include at least one processor and at least one memory comprising a plurality of instructions stored thereon that, in response to execution by the at least one processor, causes the system to receive at least one user message from a real-time contact center interaction with a user, generate, by an artificial intelligence system, at least one empathy score based on the at least one message using the machine learning, wherein each of the at least one empathy score is indicative of a real-time empathy of the user, generate, by the artificial intelligence system, an empathetic text response to the at least one user message based on the at least one empathy score, and respond to the at least one user message in the real-time contact center interaction based on the empathetic text response generated by the artificial intelligence system.

In some embodiments, the real-time contact center interaction with the user may be a real-time contact center interaction between the user and a chatbot of the contact center.

In some embodiments, to respond to the at least one user message in the real-time contact center interaction may include to respond with the empathetic text response via the chatbot.

In some embodiments, the plurality of instructions may further cause the system to transfer the real-time contact center interaction with the user to a contact center agent, notify the artificial intelligence system that the real-time contact center interaction is transferred to the contact center agent, and transmit the at least one empathy score to an agent device of the contact center agent.

In some embodiments, to generate the at least one empathy score based on the at least one message using the machine learning may include to determine a high level empathy of the user.

In some embodiments, to generate the at least one empathy score based on the at least one message using the machine learning may include to determine a deep level empathy of the user.

In some embodiments, to determine the deep level empathy of the user may include to select a deep level empathy of the user from a group of at least ten different categories of deep level empathies.

In some embodiments, to generate the at least one empathy score based on the at least one message using the machine learning may include to determine a language style of the user.

In some embodiments, the real-time contact center interaction with the user may be a real-time contact center interaction between the user and a contact center agent, and the plurality of instructions may further cause the system to receive a draft agent response to the at least one user message by the contact center agent, and auto-suggest, by the artificial intelligence system, an empathetic agent response to the at least one user message based on the draft agent response and the at least one empathy score.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 7 is a simplified flow diagram of at least one embodiment of a method of leveraging machine learning to predict empathy for improved contact center interactions between clients and agents;

DETAILED DESCRIPTION

Figure 1:
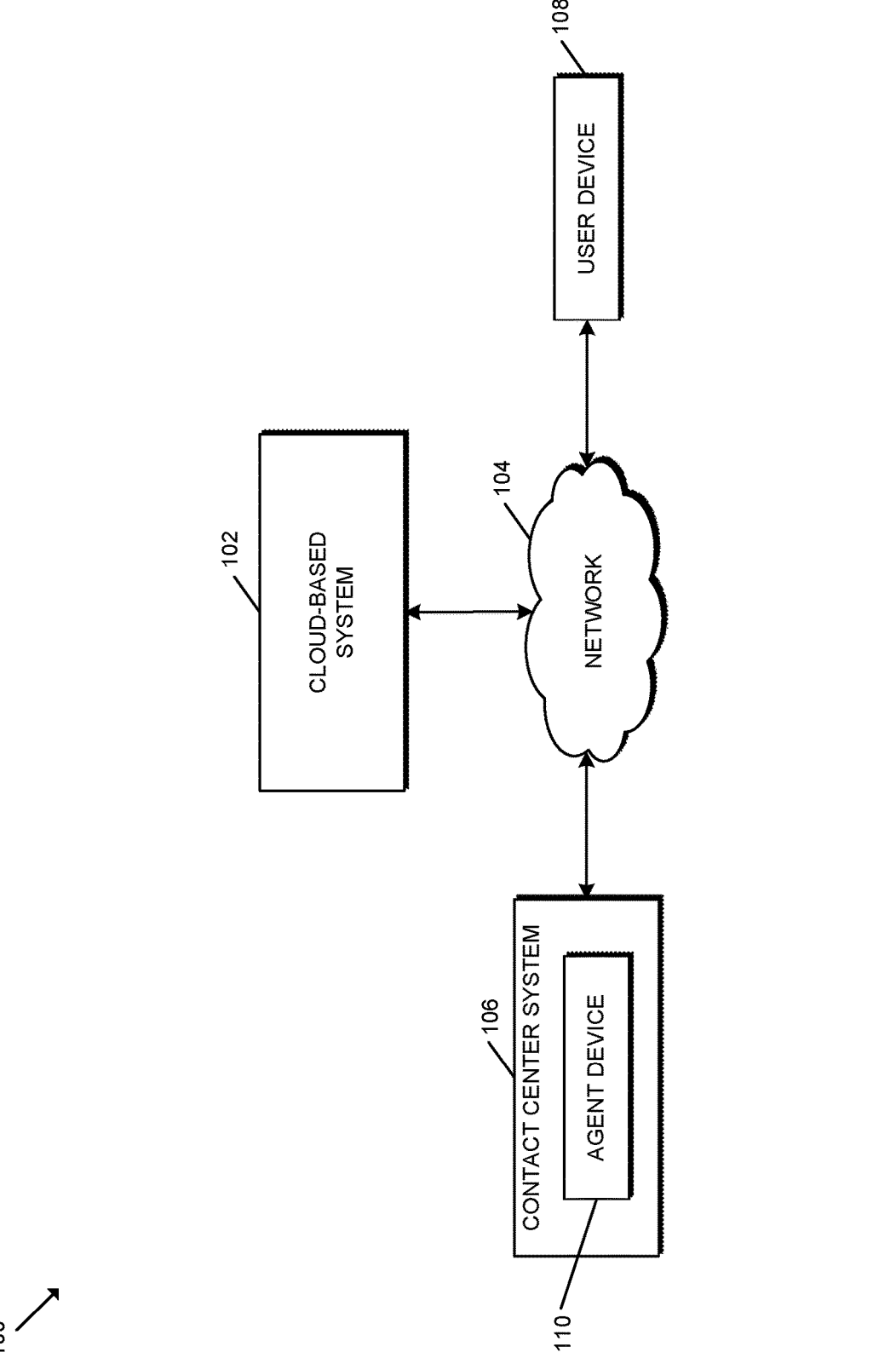
FIG. 1 depicts a simplified block diagram of at least one embodiment of a system for leveraging machine learning to predict empathy for improved contact center interactions.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, a system for leveraging machine learning to predict empathy for improved contact center interactions includes a cloud-based system 102, a network 104, a contact center system 106, and a user device 108. Additionally, the illustrative contact center system 106 includes an agent device 110. Although only one cloud-based system 102, one network 104, one contact center system 106, one user device 108, and one agent device 110 are shown in the illustrative embodiment of FIG. 1, the system 100 may include multiple cloud-based systems 102, networks 104, contact center systems 106, user devices 108, and/or agent devices 110 in other embodiments. For example, in some embodiments, multiple cloud-based systems 102 (e.g., related or unrelated systems) may be used to perform the various functions described herein. Further, in some embodiments, one or more of the systems described herein may be excluded from the system 100, one or more of the systems described as being independent may form a portion of another system, and/or one or more of the systems described as forming a portion of another system may be independent.

It should be appreciated that the technologies described herein leverage machine learning to predict empathy of the user/client such that the chatbot and/or the contact center agent can respond to the user with an appropriate level of empathy. Accordingly, the system 100 allows for an improved understanding of user empathy, which may impact user retention/loyalty by building trust with the user. As described in greater detail below, the system 100 may predict a user empathy score for chatbot interactions and help the chatbot to respond to the user empathetically based on the predicted score. Similarly, the system 100 may assist contact center agents by providing the user's empathy score when an interaction is transferred from the chatbot to a contact center agent in real time. Further, the system 100 may assist contact center agents by analyzing draft responses by the contact center agents in real time to suggest more empathetic text that the agent may use to respond to the user.

The cloud-based system 102 may be embodied as any one or more types of devices/systems capable of performing the functions described herein. For example, in the illustrative embodiment, the cloud-based system 102 may be leveraged by the contact center system 106 or agent thereof in order to provide support for resolving contact center client issues. As described herein, the cloud-based system 102 may leverage an artificial intelligence (AI) system (e.g., the empathy AI system 506 of FIG. 5) to predict the user's real-time empathy based on the interaction text (e.g., the last one or more messages in the interaction) and/or to generate empathetic text. Although the cloud-based system 102 is described herein in the singular, it should be appreciated that the cloud-based system 102 may be embodied as or include multiple servers/systems in some embodiments. Further, although the cloud-based system 102 is described herein as a cloud-based system, it should be appreciated that the system 102 may be embodied as one or more servers/systems residing outside of a cloud computing environment in other embodiments. In cloud-based embodiments, the cloud-based system 102 may be embodied as a server-ambiguous computing solution similar to that described below.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108, 110 of the system 100. It should be appreciated that the various devices/systems 102, 106, 108, 110 may communicate with one another via different networks 104 depending on the source and/or destination devices/systems 102, 106, 108, 110.

The contact center system 106 may be embodied as any system capable of providing contact center services (e.g., call center services) to an end user and otherwise performing the functions described herein. Depending on the particular embodiment, it should be appreciated that the contact center system 106 may be located on the premises/campus of the organization utilizing the contact center system 106 and/or located remotely relative to the organization (e.g., in a cloud-based computing environment). In some embodiments, a portion of the contact center system 106 may be located on the organization's premises/campus while other portions of the contact center system 106 are located remotely relative to the organization's premises/campus. As such, it should be appreciated that the contact center system 106 may be deployed in equipment dedicated to the organization or third-party service provider thereof and/or deployed in a remote computing environment such as, for example, a private or public cloud environment with infrastructure for supporting multiple contact centers for multiple enterprises. In some embodiments, the contact center system 106 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center. In some embodiments, the contact center system 200 may be a contact center system similar to the contact center system 200 described in reference to FIG. 2.

The agent device 110 may be embodied as any type of device or system of the contact center system 106 that may be used by an agent of the contact center for communication with the user device 108 (e.g., of a contact center user/client), the cloud-based system 102, and/or otherwise capable of performing the functions described herein. In some embodiments, the agent device 110 may be embodied as an agent device similar to the agent devices 230 described in reference to the contact center system 200 of FIG. 2.

The user device 108 may be embodied as any type of device (e.g., of a contact center user/client) capable of executing an application and otherwise performing the functions described herein. For example, in some embodiments, the user device 108 is configured to execute an application to participate in a conversation with a human agent (e.g., via the agent device 118), personal bot, automated agent, chatbot, or other automated system. As such, the user device 108 may have various input/output devices with which a user may interact to provide and receive audio, text, video, and/or other forms of data. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

Figure 3:
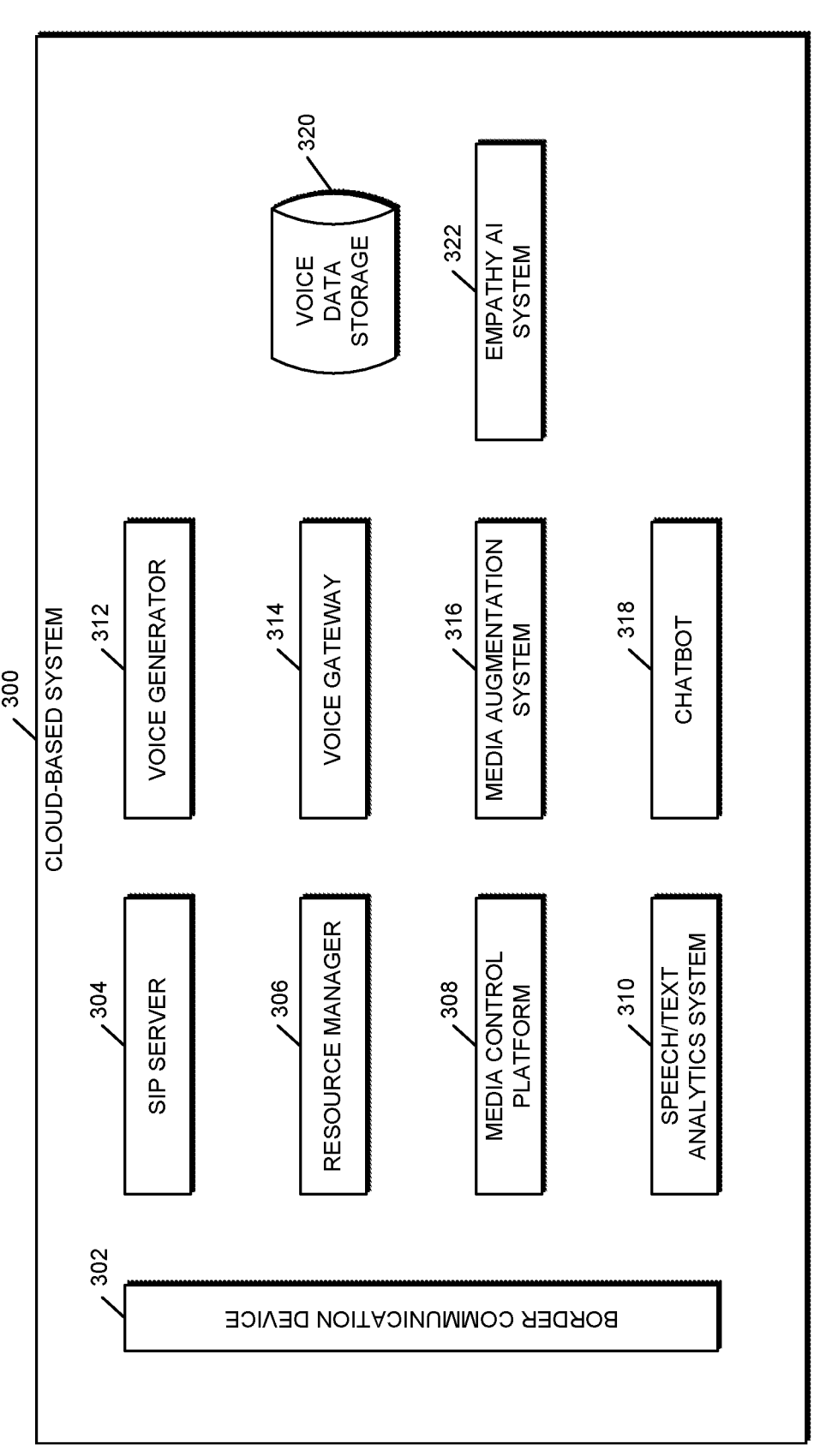
FIG. 3 is a simplified block diagram of at least one embodiment of a cloud-based system.
Figure 4:
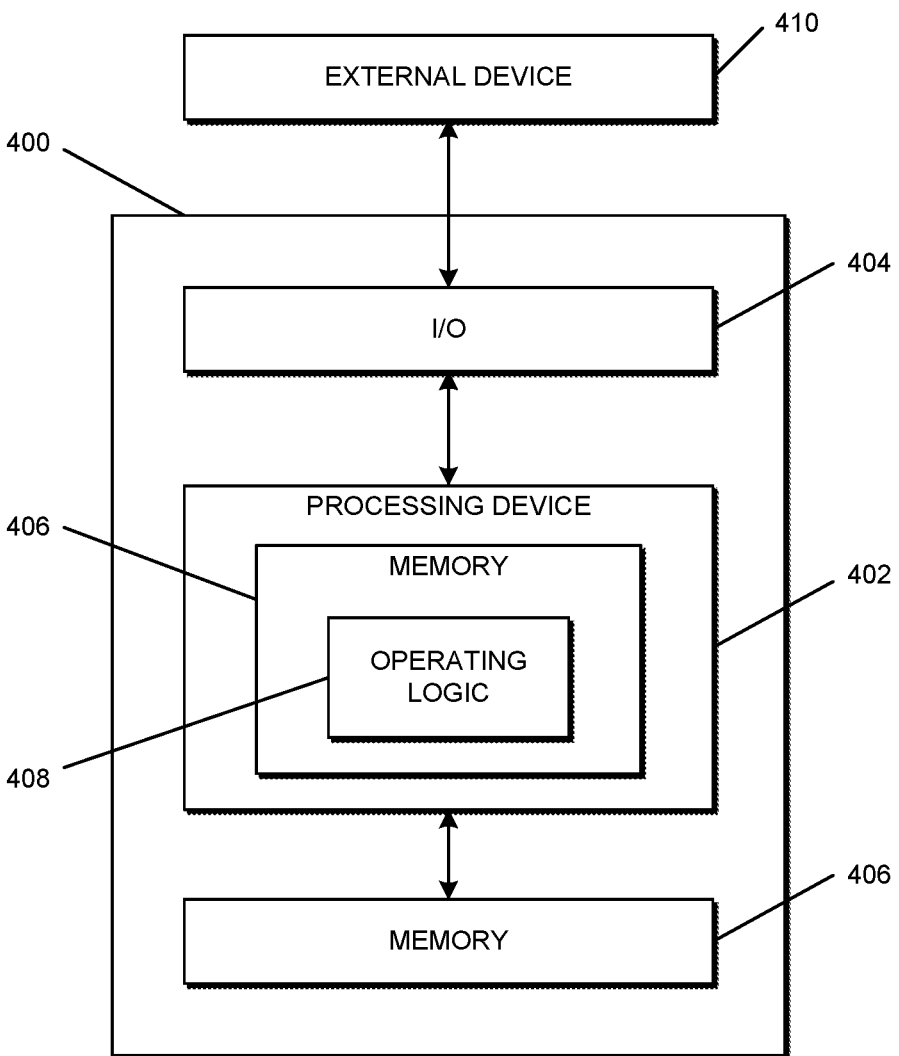
FIG. 4 is a simplified block diagram of at least one embodiment of a computing device.

It should be appreciated that each of the cloud-based system 102, the network 104, the contact center system 106, the user device 108, and the agent device 110 may be embodied as, executed by, form a portion of, or associated with any type of device/system, collection of devices/systems, and/or portion(s) thereof suitable for performing the functions described herein (e.g., the computing device 400 of FIG. 4). In various embodiments, it should be appreciated that the contact center system 106 may form a portion of, constitute a feature/device superset of, or involve a contact center system similar to the contact center system 200 of FIG. 2. Additionally, the cloud-based system 102 may form a portion of, constitute a feature/device superset of, or involve a cloud-based system similar to the cloud-based system 300 of FIG. 3. In some embodiments, it should be appreciated that the cloud-based system 102 may be communicatively coupled to the contact center system 106, form a portion of the contact center system 106, and/or be otherwise used in conjunction with the contact center system 106.

Figure 2:
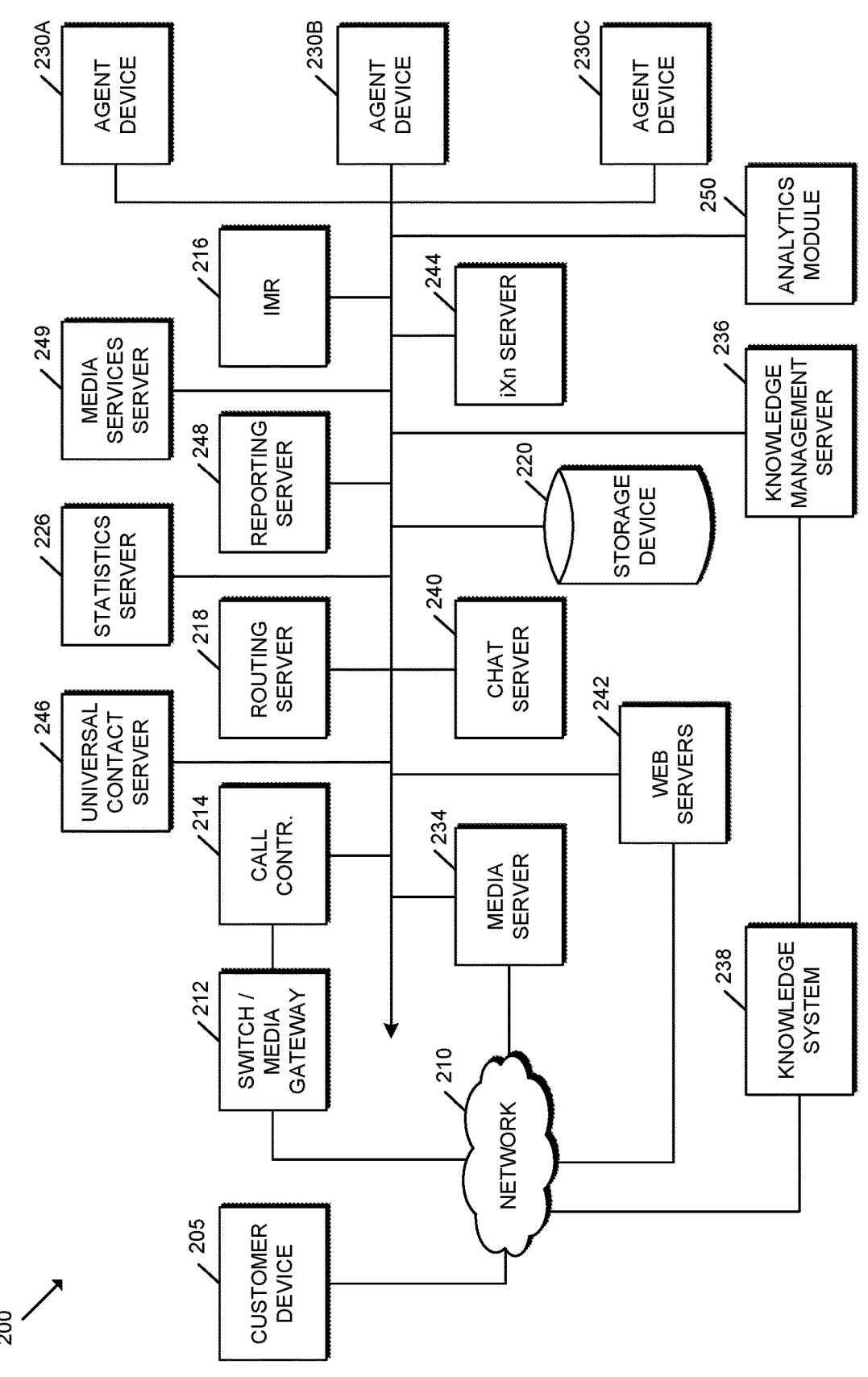
FIG. 2 is a simplified block diagram of at least one embodiment of a contact center system.

Referring now to FIG. 2, a simplified block diagram of at least one embodiment of a communications infrastructure and/or content center system, which may be used in conjunction with one or more of the embodiments described herein, is shown. The contact center system 200 may be embodied as any system capable of providing contact center services (e.g., call center services, chat center services, SMS center services, etc.) to an end user and otherwise performing the functions described herein. The illustrative contact center system 200 includes a customer device 205, a network 210, a switch/media gateway 212, a call controller 214, an interactive media response (IMR) server 216, a routing server 218, a storage device 220, a statistics server 226, agent devices 230A, 230B, 230C, a media server 234, a knowledge management server 236, a knowledge system 238, chat server 240, web servers 242, an interaction (iXn) server 244, a universal contact server 246, a reporting server 248, a media services server 249, and an analytics module 250. Although only one customer device 205, one network 210, one switch/media gateway 212, one call controller 214, one IMR server 216, one routing server 218, one storage device 220, one statistics server 226, one media server 234, one knowledge management server 236, one knowledge system 238, one chat server 240, one iXn server 244, one universal contact server 246, one reporting server 248, one media services server 249, and one analytics module 250 are shown in the illustrative embodiment of FIG. 2, the contact center system 200 may include multiple customer devices 205, networks 210, switch/media gateways 212, call controllers 214, IMR servers 216, routing servers 218, storage devices 220, statistics servers 226, media servers 234, knowledge management servers 236, knowledge systems 238, chat servers 240, iXn servers 244, universal contact servers 246, reporting servers 248, media services servers 249, and/or analytics modules 250 in other embodiments. Further, in some embodiments, one or more of the components described herein may be excluded from the system 200, one or more of the components described as being independent may form a portion of another component, and/or one or more of the component described as forming a portion of another component may be independent.

It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider/agent providing customer services through the contact center system 200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "users," "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another embodiment, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 400, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

It should be understood that any of the computer-implemented components, modules, or servers described in relation to FIG. 2 may be implemented via one or more types of computing devices, such as, for example, the computing device 400 of FIG. 4. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 200 may initiate inbound communications (e.g., telephone calls, emails, chats, etc.) to the contact center system 200 via a customer device 205. While FIG. 2 shows one such customer device—i.e., customer device 205—it should be understood that any number of customer devices 205 may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of the network typically depending on the type of customer device being used and the form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 212 may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, and/or other types of calls. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

The interactive media response (IMR) server 216 may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an EIR script for querying customers on their needs. For example, a contact center for a bank may instruct customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described herein, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

It should be appreciated that the contact center system 200 may include one or more mass storage devices—represented generally by the storage device 220—for storing data in one or more databases relevant to the functioning of the contact center. For example, the storage device 220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database. Agent data maintained by the contact center system 200 may include, for example, agent availability and agent profiles, schedules, skills, handle time, and/or other relevant data. As another example, the storage device 220 may store interaction data in an interaction database. Interaction data may include, for example, data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therein or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 226 may be configured to record and aggregate data relating to the performance and operational aspects of the contact center system 200. Such information may be compiled by the statistics server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center system 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. Although FIG. 2 shows three such agent devices 230—i.e., agent devices 230A, 230B and 230C—it should be understood that any number of agent devices 230 may be present in a particular embodiment.

The multimedia/social media server 234 may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 236 may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials. As an example, the knowledge system 238 may be embodied as IBM Watson or a similar system.

The chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 236 and the knowledge systems 238 for receiving suggestions and answers to queries posed by customers during a chat so that, for example, links to relevant articles can be provided.

The web servers 242 may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 230 may include a workbin. As an example, a workbin may be maintained in the buffer memory of the corresponding agent device 230.

The universal contact server (UCS) 246 may be configured to retrieve information stored in the customer database and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 250 may be configured to provide systems and methods for performing analytics on data received from a plurality of different data sources as functionality described herein may require. In accordance with example embodiments, the analytics module 250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database and agent database. The analytics module 250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 250 may be configured to retrieve data stored within the storage device 220 for use in developing and training machine algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment. It should be appreciated that each of the devices of the call center system 200 may be embodied as, include, or form a portion of one or more computing devices similar to the computing device 400 described below in reference to FIG. 4.

Referring now to FIG. 3, a simplified block diagram of at least one embodiment of a cloud-based system 300 is shown. The illustrative cloud-based system 300 includes a border communication device 302, a SIP server 304, a resource manager 306, a media control platform 308, a speech/text analytics system 310, a voice generator 312, a voice gateway 314, a media augmentation system 316, a chatbot 318, voice data storage 320, and an empathy AI system 322. Although only one border communication device 302, one SIP server 304, one resource manager 306, one media control platform 308, one speech/text analytics system 310, one voice generator 312, one voice gateway 314, one media augmentation system 316, one chatbot 318, one voice data storage 320, and one empathy AI system 322 are shown in the illustrative embodiment of FIG. 3, the cloud-based system 300 may include multiple border communication devices 302, SIP servers 304, resource managers 306, media control platforms 308, speech/text analytics systems 310, voice generators 312, voice gateways 314, media augmentation systems 316, chatbots 318, voice data storages 320, and/or empathy AI systems 322 in other embodiments. For example, in some embodiments, multiple chatbots 318 may be used to communicate regarding different subject matters handled by the same cloud-based system 300. Further, in some embodiments, one or more of the components described herein may be excluded from the system 300, one or more of the components described as being independent may form a portion of another component, and/or one or more of the component described as forming a portion of another component may be independent.

The border communication device 302 may be embodied as any one or more types of devices/systems that are capable of performing the functions described herein. For example, in some embodiments, the border communication device 302 may be configured to control signaling and media streams involved in setting up, conducting, and tearing down voice conversations and other media communications between, for example, an end user and contact center system. In some embodiments, the border communication device 302 may be a session border controller (SBC) controlling the signaling and media exchanged during a media session (also referred to as a "call," "telephony call," or "communication session") between the end user and contact center system. In some embodiments, the signaling exchanged during a media session may include SIP, H.323, Media Gateway Control Protocol (MGCP), and/or any other voice-over IP (VoIP) call signaling protocols. The media exchanged during a media session may include media streams that carry the call's audio, video, or other data along with information of call statistics and quality.

In some embodiments, the border communication device 302 may operate according to a standard SIP back-to-back user agent (B2BUA) configuration. In this regard, the border communication device 302 may be inserted in the signaling and media paths established between a calling and called parties in a VoIP call. In some embodiments, it should be understood that other intermediary software and/or hardware devices may be invoked in establishing the signaling and/or media paths between the calling and called parties.

In some embodiments, the border communication device 302 may exert control over signaling (e.g., SIP messages) and media streams (e.g., RTP data) routed to and from a contact center system (e.g., the contact center system 106) and other devices (e.g., a customer/client device such as the user device 108, the cloud-based system 102, and/or other devices) that traverse the network (e.g., the network 104). In this regard, the border communication device 302 may be coupled to trunks that carry signals and media for calls to and from the user device over the network, and to trunks that carry signals and media to and from the contact center system over the network.

The SIP server 304 may be embodied as any one or more types of devices/systems that are capable of performing the functions described herein. For example, in some embodiments, the SIP server 204 may act as a SIP B2UBA and may control the flow of SIP requests and responses between SIP endpoints. Any other controller configured to set up and tear down VoIP communication sessions may be contemplated in addition to or in lieu of the SIP server 304 in other embodiments. The SIP server 304 may be a separate logical component or may be combined with the resource manager 306. In some embodiments, the SIP server 304 may be hosted at a contact center system (e.g., the contact center system 106). Although a SIP server 304 is used in the illustrative embodiment, another call server configured with another VoIP protocol may be used in addition to or in lieu of SIP, such as, for example, H.232 protocol, Media Gateway Control Protocol, Skype protocol, and/or other suitable technologies in other embodiments.

The resource manager 306 may be embodied as any one or more types of devices/systems that are capable of performing the functions described herein. In the illustrative embodiment, the resource manager 306 may be configured to allocate and monitor a pool of media control platforms for providing load balancing and high availability for each resource type. In some embodiments, the resource manager 306 may monitor and may select a media control platform 308 from a cluster of available platforms. The selection of the media control platform 308 may be dynamic, for example, based on identification of a location of a calling end user, type of media services to be rendered, detected quality of a current media service, and/or other factors.

In some embodiments, the resource manager 306 may be configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to some embodiments, the resource manager may provide hierarchical multi-tenant configurations for service providers, enabling them to apportion a select number of resources for each tenant.

In some embodiments, the resource manager 306 may be configured to act as a SIP proxy, a SIP registrar, and/or a SIP notifier. In this regard, the resource manager 306 may act as a proxy for SIP traffic between two SIP components. As a SIP registrar, the resource manager 306 may accept registration of various resources via, for example, SIP REGISTER messages. In this manner, the cloud-based system 300 may support transparent relocation of call-processing components. In some embodiments, components such as the media control platform 308 do not register with the resource manager 306 at startup. The resource manager 306 may detect instances of the media control platform 308 through configuration information retrieved from the configuration database. If the media control platform 308 has been configured for monitoring, the resource manager 306 may monitor resource health by using, for example, SIP OPTIONS messages. In some embodiments, to determine whether the resources in the group are alive, the resource manager 306 may periodically send SIP OPTIONS messages to each media control platform 308 resource in the group. If the resource manager 306 receives an OK response, the resources are considered alive. It should be appreciated that the resource manager 306 may be configured to perform other various functions, which have been omitted for brevity of the description. The resource manager

306 and the media control platform 308 may collectively be referred to as a media controller.

In some embodiments, the resource manager 306 may act as a SIP notifier by accepting, for example, SIP SUB-SCRIBE requests from the SIP server 304 and maintaining multiple independent subscriptions for the same or different SIP devices. The subscription notices are targeted for the tenants that are managed by the resource manager 306. In this role, the resource manager 306 may periodically generate SIP NOTIFY requests to subscribers (or tenants) about port usage and the number of available ports. The resource manager 306 may support multi-tenancy by sending notifications that contain the tenant name and the current status (in- or out-of-service) of the media control platform 308 that is associated with the tenant, as well as current capacity for the tenant.

The media control platform 308 may be embodied as any service or system capable of providing media services and otherwise performing the functions described herein. For example, in some embodiments, the media control platform 308 may be configured to provide call and media services upon request from a service user. Such services may include, without limitation, initiating outbound calls, playing music or providing other media while a call is placed on hold, call recording, conferencing, call progress detection, playing audio/video prompts during a customer self-service session, and/or other call and media services. One or more of the services may be defined by voice applications (e.g. VoiceXML applications) that are executed as part of the process of establishing a media session between the media control platform 308 and the end user.

The speech/text analytics system (STAS) 310 may be embodied as any service or system capable of providing various speech analytics and text processing functionalities (e.g., text-to-speech) as will be understood by a person of skill in the art and otherwise performing the functions described herein. The speech/text analytics system 310 may perform automatic speech and/or text recognition and grammar matching for end user communications sessions that are handled by the cloud-based system 300. The speech/text analytics system 310 may include one or more processors and instructions stored in machine-readable media that are executed by the processors to perform various operations. In some embodiments, the machine-readable media may include non-transitory storage media, such as hard disks and hardware memory systems.

The voice generator 312 may be embodied as any service or system capable of generating a voice communication and otherwise performing the functions described herein. In some embodiments, the voice generator 312 may generate the voice communication based on a particular voice signature.

The voice gateway 314 may be embodied as any service or system capable of performing the functions described herein. In the illustrative embodiment, the voice gateway 314 receives end user calls from or places calls to voice communications devices, such as an end user device, and responds to the calls in accordance with a voice program that corresponds to a communication routing configuration of the contact center system. In some embodiments, the voice program may include a voice avatar. The voice program may be accessed from local memory within the voice gateway 314 or from other storage media in the cloud-based system 300. In some embodiments, the voice gateway 314 may process voice programs that are script-based voice applications. The voice program, therefore, may be a script written in a scripting language, such as voice extensible markup language (VoiceXML) or speech application language tags (SALT). The cloud-based system 300 may also communicate with the voice data storage 320 to read and/or write user interaction data (e.g., state variables for a data communications session) in a shared memory space.

The media augmentation system 316 may be embodied as any service or system capable of specifying how the portions of the cloud-based system 300 (e.g., one or more of the border communications device 302, the SIP server 304, the resource manager 306, the media control platform 308, the speech/text analytics system 310, the voice generator 312, the voice gateway 314, the media augmentation system 316, the chatbot 318, the voice data storage 320, the empathy AI system 322, and/or one or more portions thereof) interact with each other and otherwise performing the functions described herein. In some embodiments, the media augmentation system 316 may be embodied as or include an application program interface (API). In some embodiments, the media augmentation system 316 enables integration of differing parameters and/or protocols that are used with various planned application and media types utilized within the cloud-based system 300.

The chatbot 318 may be embodied as any automated service or system capable of using automation to engage with end users and otherwise performing the functions described herein. For example, in some embodiments, the chatbot 318 may operate, for example, as an executable program that can be launched according to demand for the particular chatbot. In some embodiments, the chatbot 318 simulates and processes human conversation (either written or spoken), allowing humans to interact with digital devices as if the humans were communicating with another human. In some embodiments, the chatbot 318 may be as simple as rudimentary programs that answer a simple query with a single-line response, or as sophisticated as digital assistants that learn and evolve to deliver increasing levels of personalization as they gather and process information. In some embodiments, the chatbot 318 includes and/or leverages artificial intelligence, adaptive learning, bots, cognitive computing, and/or other automation technologies. Chatbot 318 may also be referred to herein as one or more chat robots, AI chatbots, automated chat robot, chatterbots, dialog systems, conversational agents, automated chat resources, and/or bots.

A benefit of utilizing automated chat robots for engaging in chat conversations with end users may be that it helps contact centers to more efficiently use valuable and costly resources like human resources, while maintaining end user satisfaction. For example, chat robots may be invoked to initially handle chat conversations without a human end user knowing that it is conversing with a robot. The chat conversation may be escalated to a human resource if and when appropriate. Thus, human resources need not be unnecessarily tied up in handling simple requests and may instead be more effectively used to handle more complex requests or to monitor the progress of many different automated communications at the same time.

The voice data storage 320 may be embodied as one or more databases, data structures, and/or data storage devices capable of storing data in the cloud-based system 300 or otherwise facilitating the storage of such data for the cloud-based system 300. For example, in some embodiments, the voice data storage 320 may include one or more cloud storage buckets. In other embodiments, it should be appreciated that the voice data storage 320 may, additionally or alternatively, include other types of voice data storage mechanisms that allow for dynamic scaling of the amount of data storage available to the cloud-based system 300. In some embodiments, the voice data storage 320 may store scripts (e.g., pre-programmed scripts or otherwise). Although the voice data storage 320 is described herein as data storages and databases, it should be appreciated that the voice data storage 320 may include both a database (or other type of organized collection of data and structures) and data storage for the actual storage of the underlying data. The voice data storage 320 may store various data useful for performing the functions described herein.

The empathy AI system 322 may be embodied as any device or collection of devices capable of performing the functions described herein. The empathy AI system 322 may leverage artificial intelligence (e.g., machine learning) to predict users' real-time empathy based on text from the respective interaction (e.g., the last one or more messages in the interaction) and/or to generate empathetic text that may be used by the chatbot and/or contact center agent when responding to the user during the interaction. In the illustrative embodiment, the empathy AI system 322 analyzes a user's empathy at a granular level based on high level empathy, deep level empathy, and language style of the user. In some embodiments, a high level empathy prediction/score may fall under one of four categories (e.g., anger, joyfulness, optimism, or sadness). Similarly, in some embodiments, a deep level empathy prediction/score may be classified into one of twenty-eight categories (e.g., sentimental, afraid, proud, faithful, terrified, jealous, grateful, prepared, embarrassed, excited, annoyed, lonely, ashamed, guilty, surprised, nostalgic, confident, furious, disappointed, caring, trusting, disgusted, anticipating, anxious, hopeful, impressed, apprehensive, or devastated). Further, in some embodiments, a language style prediction/score may be classified as one of three categories (e.g., confident, analytical, or determinant). In other embodiments, it should be appreciated that each of the high level empathy, deep level empathy, and/or language style may have different categories from those described above and/or a different number of categories form that described above. For example, in some embodiments, the deep level empathy may be selected from ten or more different categories.

It should be appreciated that the artificial intelligence and/or machine learning algorithms and techniques used by the empathy AI system 322 may vary depending on the particular embodiment. For example, in some embodiments, the empathy AI system 322 may utilize a fine-tuned version of the Bidirectional Encoder Representations from Transformers (BERT) model, such as the Robustly Optimized BERT pre-training approach (RoBERTa) model, to predict the user empathy in real time. Accordingly, in some embodiments, the empathy AI system 322 may utilize the RoBERTa model and/or another suitable model in order to generate one or more empathy scores, for example, including or based on the high level empathy, the deep level empathy, and/or the language style.

It should be further appreciated that, in some embodiments, the empathy AI system 322 may utilize a sequence-to-sequence machine learning (ML) model to generate an empathetic response to the user/client, which may be used by the chatbot and/or contact center agent in responding to the user/client. For example, in some embodiments, the chatbot may respond to the user with the empathetic response generated by the empathy AI system 322. In other embodiments, the contact center agent may begin typing a reply to the user's last message, which may be analyzed by the empathy AI system 322 in real-time such that the empathy AI system 322 generates an empathetic response (e.g., based on the agent's draft response). In various embodiments, a long short-term memory (LSTM)-based approach and/or a gated recurrent unit (GRU)-based approach to machine learning may be used to auto-suggest an empathetic response to the user.

Although various specific AI/ML models are described above as being used in various embodiments, it should be appreciated that the empathy AI system 322 and/or other components of the cloud-based system 300 may utilize other AI/ML in other embodiments. For example, in performing the various AI-related functions described herein, the computing system may utilize natural language processing algorithms, large language models (LLMs), neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning (ML) algorithms, models, techniques, and/or artificial intelligence technologies. Additionally, the number of AI/ML models used by the computing system may vary depending on the particular embodiment. For example, in some embodiments, a single AI/ML model may be used, whereas in other embodiments, multiple AI/ML models may be used.

Referring now to FIG. 4, a simplified block diagram of at least one embodiment of a computing device 400 is shown. The illustrative computing device 400 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 400, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2 and/or the cloud-based system 300 of FIG. 3—the various servers and computer devices thereof may be located on local computing devices 400 (e.g., on-site at the same physical location as the agents of the contact center), remote computing devices 400 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 400 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 400 includes a processing device 402 that executes algorithms and/or processes data in accordance with operating logic 408, an input/output device 404 that enables communication between the computing device 400 and one or more external devices 410, and memory 406 which stores, for example, data received from the external device 410 via the input/output device 404.

The input/output device 404 allows the computing device 400 to communicate with the external device 410. For example, the input/output device 404 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 400 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 400. The input/output device 404 may include hardware, software, and/or firmware suitable for performing the techniques described herein.

The external device 410 may be any type of device that allows data to be inputted or outputted from the computing device 400. For example, in various embodiments, the external device 410 may be embodied as one or more of the devices/systems described herein, and/or a portion thereof. Further, in some embodiments, the external device 410 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 410 may be integrated into the computing device 400.

The processing device 402 may be embodied as any type of processor(s) capable of performing the functions described herein. In particular, the processing device 402 may be embodied as one or more single or multi-core processors, microcontrollers, or other processor or processing/controlling circuits. For example, in some embodiments, the processing device 402 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 402 may be a programmable type, a dedicated hardwired state machine, or a combination thereof. Processing devices 402 with multiple processing units may utilize distributed, pipelined, and/or parallel processing in various embodiments. Further, the processing device 402 may be dedicated to performance of just the operations described herein, or may be utilized in one or more additional applications. In the illustrative embodiment, the processing device 402 is programmable and executes algorithms and/or processes data in accordance with operating logic 408 as defined by programming instructions (such as software or firmware) stored in memory 406. Additionally or alternatively, the operating logic 408 for processing device 402 may be at least partially defined by hardwired logic or other hardware. Further, the processing device 402 may include one or more components of any type suitable to process the signals received from input/output device 404 or from other components or devices and to provide desired output signals. Such components may include digital circuitry, analog circuitry, or a combination thereof.

The memory 406 may be of one or more types of non-transitory computer-readable media, such as a solid-state memory, electromagnetic memory, optical memory, or a combination thereof. Furthermore, the memory 406 may be volatile and/or nonvolatile and, in some embodiments, some or all of the memory 406 may be of a portable type, such as a disk, tape, memory stick, cartridge, and/or other suitable portable memory. In operation, the memory 406 may store various data and software used during operation of the computing device 400 such as operating systems, applications, programs, libraries, and drivers. It should be appreciated that the memory 406 may store data that is manipulated by the operating logic 408 of processing device 402, such as, for example, data representative of signals received from and/or sent to the input/output device 404 in addition to or in lieu of storing programming instructions defining operating logic 408. As shown in FIG. 4, the memory 406 may be included with the processing device 402 and/or coupled to the processing device 402 depending on the particular embodiment. For example, in some embodiments, the processing device 402, the memory 406, and/or other components of the computing device 400 may form a portion of a system-on-a-chip (SoC) and be incorporated on a single integrated circuit chip.

In some embodiments, various components of the computing device 400 (e.g., the processing device 402 and the memory 406) may be communicatively coupled via an input/output subsystem, which may be embodied as circuitry and/or components to facilitate input/output operations with the processing device 402, the memory 406, and other components of the computing device 400. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 400 may include other or additional components, such as those commonly found in a typical computing device (e.g., various input/output devices and/or other components), in other embodiments. It should be further appreciated that one or more of the components of the computing device 400 described herein may be distributed across multiple computing devices. In other words, the techniques described herein may be employed by a computing system that includes one or more computing devices. Additionally, although only a single processing device 402, I/O device 404, and memory 406 are illustratively shown in FIG. 4, it should be appreciated that a particular computing device 400 may include multiple processing devices 402, I/O devices 404, and/or memories 406 in other embodiments. Further, in some embodiments, more than one external device 410 may be in communication with the computing device 400.

The computing device 400 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 400 may communicate with other computing devices 400 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 400 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 5:
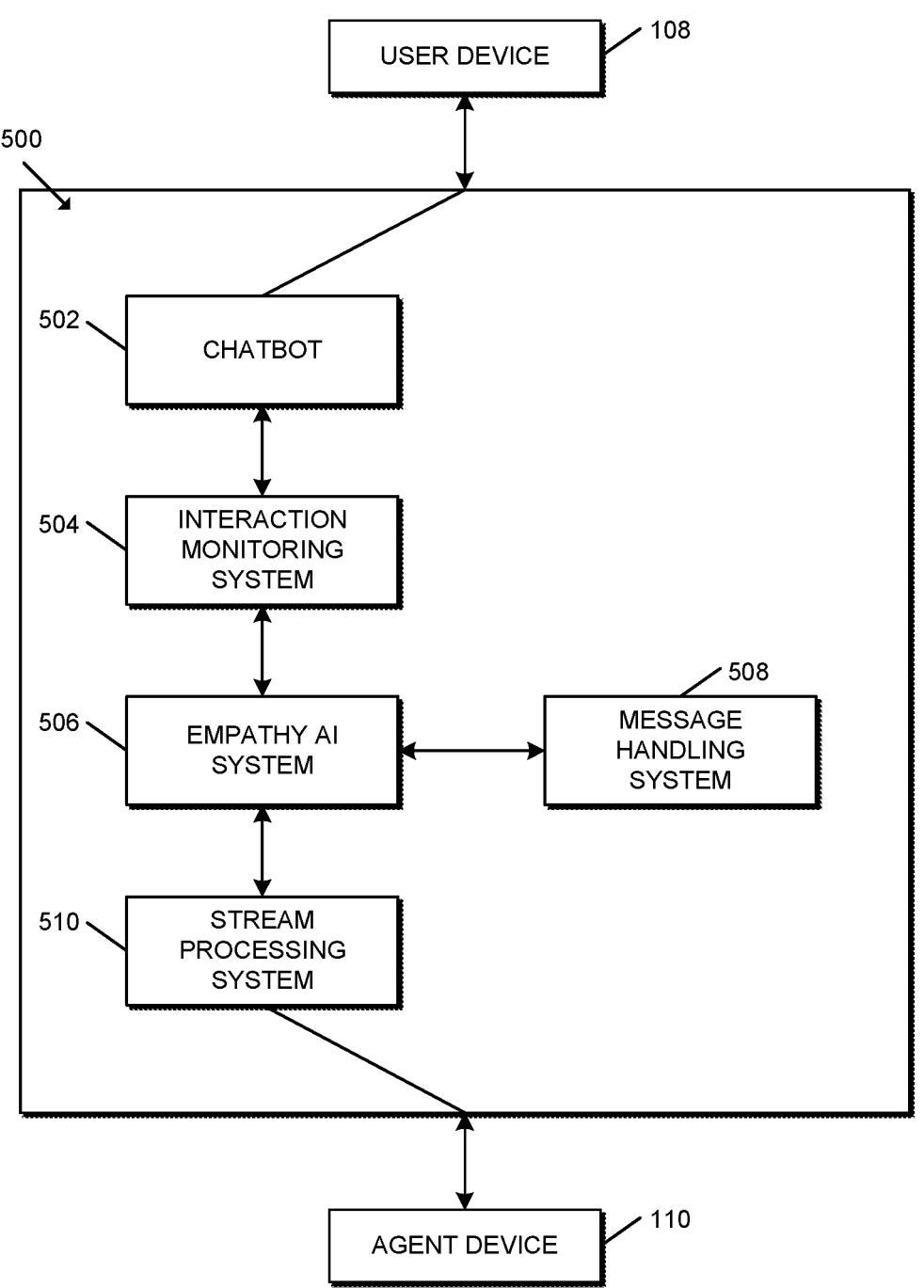
FIG. 5 is a simplified block diagram of at least one embodiment of an architecture for leveraging machine learning to predict empathy for improved contact center interactions.

Referring now to FIG. 5, a simplified embodiment of an architecture 500 for leveraging machine learning to predict empathy for improved contact center interactions depicts a chatbot 502, an interaction monitoring system 504, an empathy AI system 506, a message handling system 508, and a stream processing system 510. It should be appreciated that the chatbot 502 may be similar to the chatbot 318 and/or the empathy AI system 506 may be similar to the empathy AI system 322 as described above.

Figure 10:
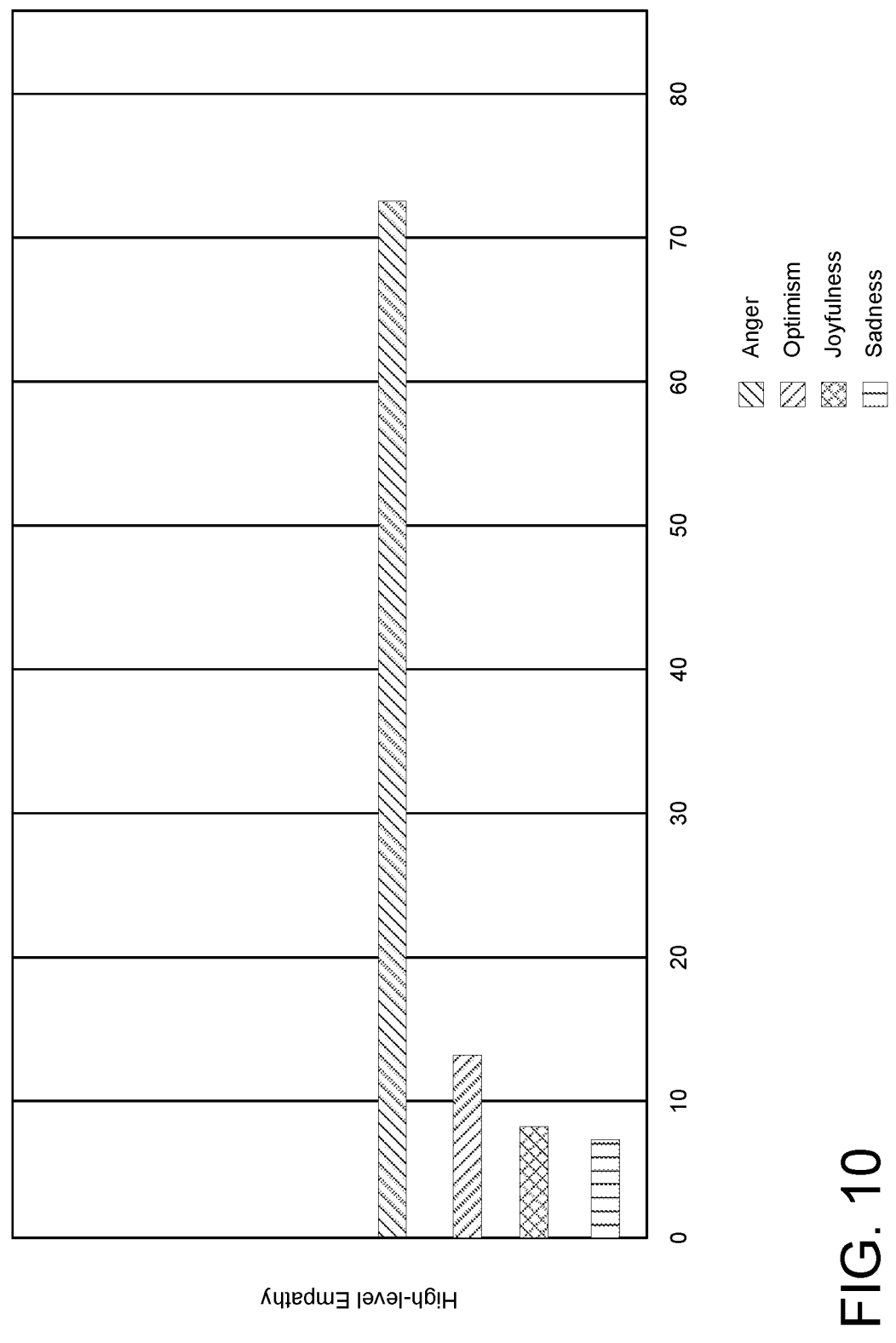
FIG. 10 is an example graph that illustrates predicted high-level empathy scores for a client.

The user/client may use the user device 108 to interact with the chatbot 502 (e.g., via a contact center interaction). In some embodiments, the chatbot 502 may be configured to receive HTTP REST requests from a public API, which contains details of end user utterances, and may respond with prompts to be relayed to the user and/or other instructions from the chatbot 502. It should be appreciated that the chatbot 502 may call a natural language understanding (NLU) service and/or knowledge search service to determine what the user is asking. When the interaction between the user and the chatbot 502 is initiated, the chatbot 502 may transmit interaction metadata to the interaction monitoring system 504. For example, the metadata of the interaction may include an interaction identifier, an interaction start time (e.g., timestamp), user contact information, and/or other metadata associated with the interaction. In the illustrative embodiment, it should be appreciated that each interaction is assigned a unique interaction identifier. The empathy AI system 522 receives the interaction identifier associated with the interaction, and transmits the interaction identifier to the message handling system 508 to retrieve the transcript of the interaction for the empathy AI system 522 based on the interaction identifier. It should be appreciated that, in embodiments in which the interaction was non-textual, the empathy AI system 506 or another component may convert the audio/video interaction into a text-based transcript. After retrieving the textual transcript of the interaction, the empathy AI system 506 leverages one or more AI models (e.g., RoBERTa) to calculate the empathy score(s), which may be provided to the agent device 110 via the stream processing system 510. As described herein, it should be further appreciated that the empathy AI system 506 may also use the sequence-to-sequence model or other suitable AI model to automatically recommend empathetic alternative text to the contact center agent based on the agent's draft response text. In some embodiments, the empathy score(s) may be displayed to the agent on the agent device 110. For example, as depicted in the example graph of FIG. 10, the empathy AI system 506 may determine the empathy score associated with high level empathy of the user to be 0.72 for anger (72%), 0.13 for optimism (13%), 0.08 for joyfulness (8%), and 0.07 for sadness (7%). It should be appreciated that the empathy scores may be normalized. The empathy scores associated with deep level empathy and/or language style may be similarly generated and displayed in a graphical visualization format (or otherwise) on the agent device

110. It should be further appreciated that the agent's user interface may be dynamically updated in real time as the interaction progresses.

Figure 6:
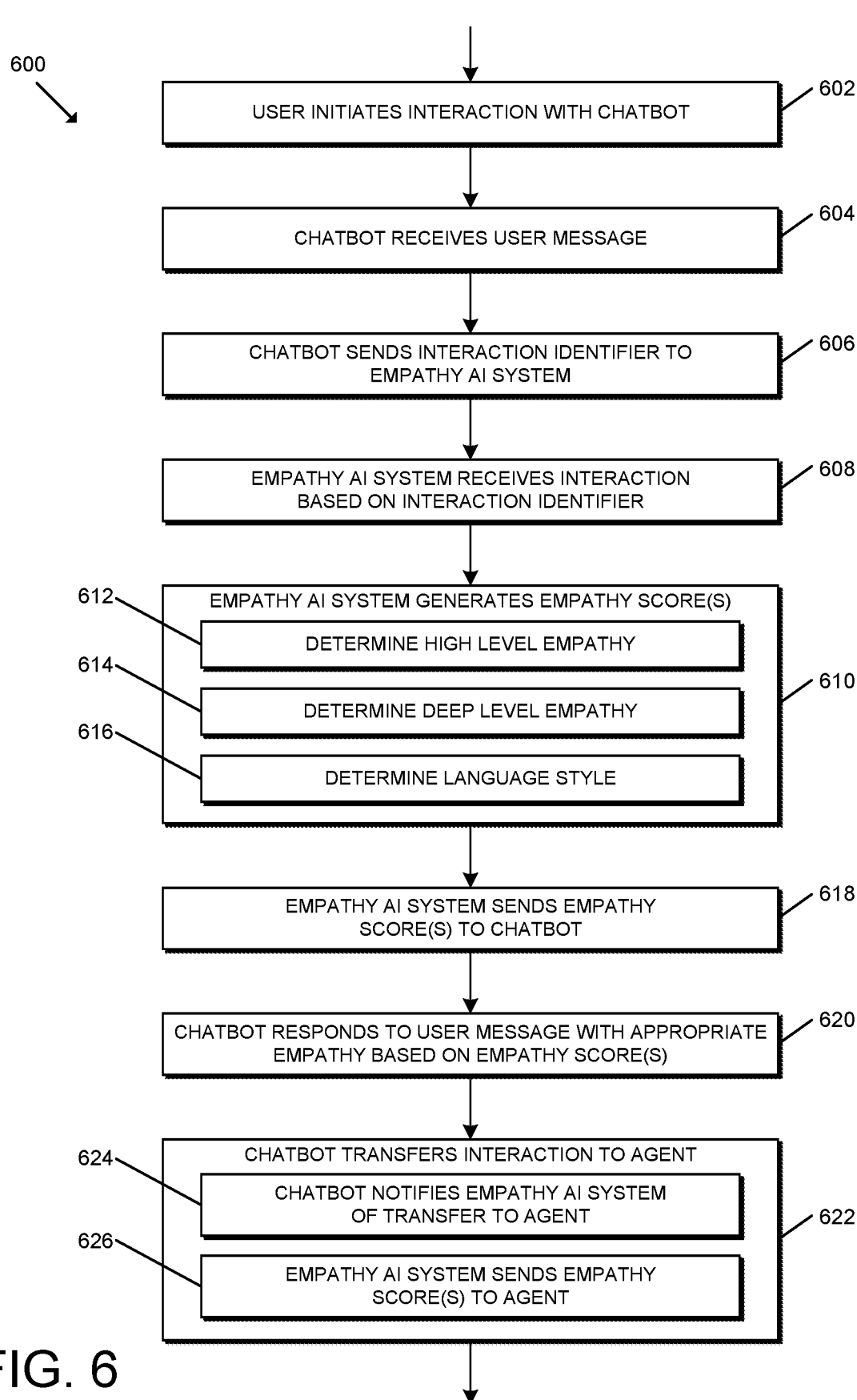
FIG. 6 is a simplified flow diagram of at least one embodiment of a method of leveraging machine learning to predict empathy for improved contact center interactions between clients and chatbots.

Referring now to FIG. 6, in use, a computing system (e.g., the system 100, the cloud-based system 102, the contact center system 106, and/or other computing devices described herein) may execute a method 600 for leveraging machine learning to predict empathy for improved contact center interactions between users/clients and chatbots. It should be appreciated that the particular blocks of the method 600 are illustrated by way of example, and such blocks may be combined or divided, added or removed, and/or reordered in whole or in part depending on the particular embodiment, unless stated to the contrary.

The illustrative method 600 begins with block 602 in which the user/client initiates an interaction with the chatbot (e.g., the chatbot 318). In block 604, the chatbot receives a user message from the user/client interacting with the chatbot, and in block 606, the chatbot sends the interaction identifier to the empathy AI system (e.g., the empathy AI system 322, 506). For example, the chatbot may send the interaction identifier via an interaction monitoring system (e.g., the interaction monitoring system 504 of FIG. 5) as described above. In block 608, the empathy AI system receives the interaction (e.g., including one or more user messages) based on the unique interaction (e.g., using a message handling system such as the message handling system 508 of FIG. 5). As described above, it should be appreciated that the empathy AI system may receive the user messages in real time during the interaction.

In block 610, the empathy AI system generates one or more empathy scores based on one or more user messages (e.g., the most recent user message(s)) of the interaction using machine learning. As described above, it should be appreciated that each of the empathy scores is indicative of a real-time empathy of the user. In particular, in block 612, the empathy AI system may determine a high level empathy of the user (e.g., and generate a corresponding high level empathy score). In block 614, the empathy AI system may determine a deep level empathy of the user (e.g., and generate a corresponding deep level empathy score). In block 616, the empathy AI system may determine a language style of the user (e.g., and generate a corresponding language style score). It should be appreciated that, in some embodiments, the empathy AI system may generate one or more aggregate empathy scores (e.g., based on the high level empathy score, the deep level empathy score, the language style score, and/or other empathy scores).

In block 618, the empathy AI system transmits the empathy score(s) to the chatbot, and in block 620, the chatbot responds to the user message with the appropriate level of empathy based on the empathy score(s). It should be appreciated that, in some embodiments, the empathy AI system may generate the empathetic response to the user message(s), which the chatbot may simply forward to the user. In other embodiments, the chatbot may generate the empathetic response based on the empathy scores.

It should be appreciated that, in some circumstances, it may be necessary or appropriate to transfer the interaction from the chatbot to a contact center agent (e.g., if the chatbot is unable to resolve a user issue). Accordingly, in block 622, the chatbot may transfer the real-time contact center interaction to the contact center agent. In doing so, in block 624, the chatbot may notify the empathy AI system that the transfer is occurring (or has occurred), and in block 626, the empathy AI system may transmit the empathy score(s) to the agent device 110 of the contact center agent, for example, such that the score(s) may be displayed on a user interface for the agent to visualize the relevant empathy characteristics of the user/client at the outset of the agent-based communication and/or in real time during the interaction.

Although the blocks 602-626 are described in a relatively serial manner, it should be appreciated that various blocks of the method 600 may be performed in parallel in some embodiments.

Figure 8:
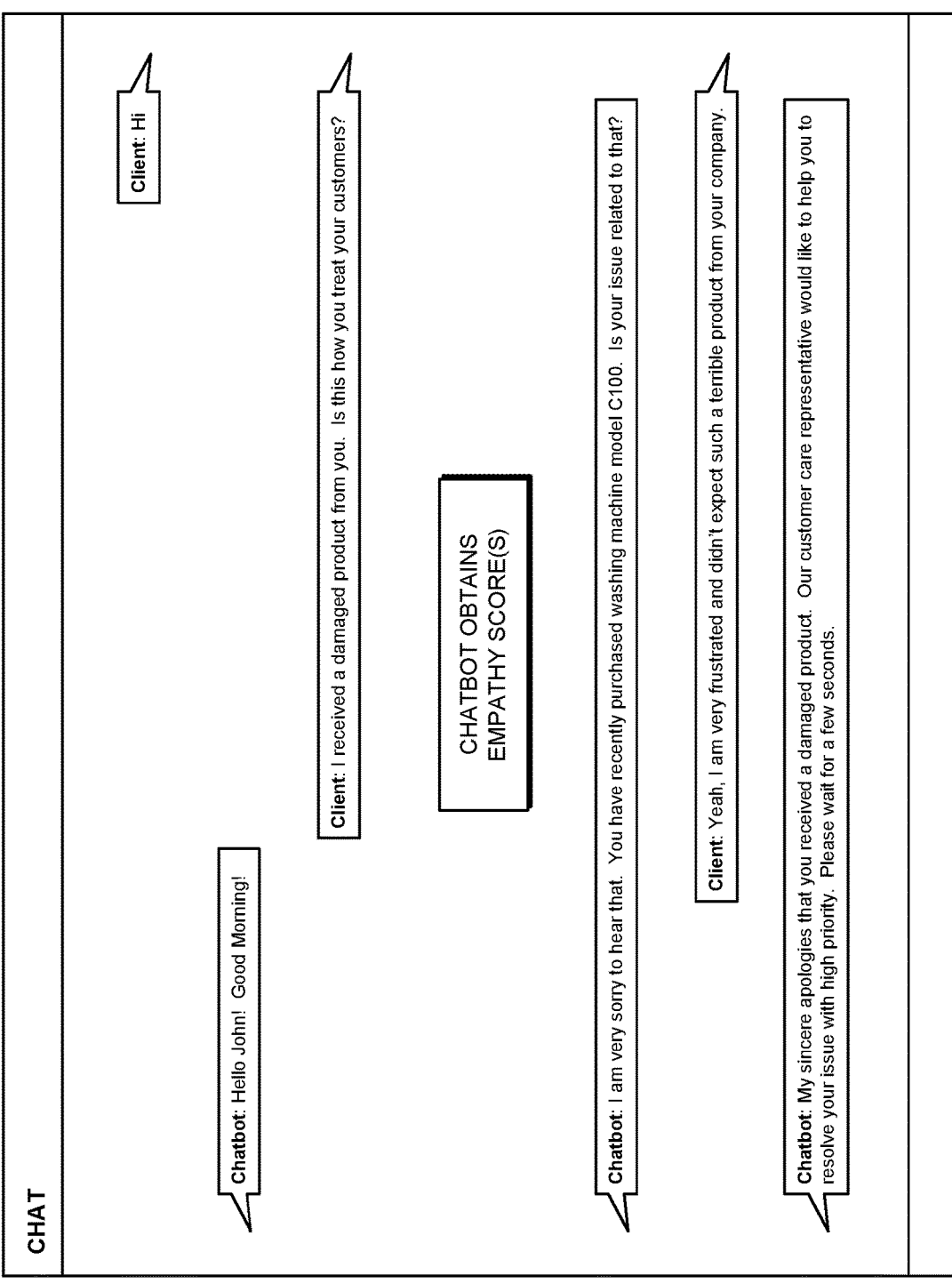
FIG. 8 is an example of an interaction between a client and a chatbot that leverages empathy predictions.

An example interaction between a user/client and a chatbot that leverages empathy predictions is depicted in FIG. 8. Suppose a client has purchased a washing machine. The client has received a damaged product, so the client accesses the client care website and begins communicating with a chatbot of the contact center system. During the interaction, the chatbot obtains the client's empathy score from the empathy AI system, which indicates that the client's high level empathy is "angry," the client's deep level empathy is "furious," and the clients language style is "confident." When responding to the client regarding the problem faced, the chatbot replies with the appropriate level of empathy that would be shown to an angry, furious, and confident client. As described above, in some embodiments, the chatbot replies with responses provided directly from the empathy AI system, whereas in other embodiments, the chatbot generates the responses based on the empathy score(s) received from the empathy AI system.

Referring now to FIG. 7, in use, a computing system (e.g., the system 100, the cloud-based system 102, the contact center system 106, and/or other computing devices described herein) may execute a method 700 for leveraging machine learning to predict empathy for improved contact center interactions between users/clients and contact center agents. It should be appreciated that the particular blocks of the method 700 are illustrated by way of example, and such blocks may be combined or divided, added or removed, and/or reordered in whole or in part depending on the particular embodiment, unless stated to the contrary.

The illustrative method 700 begins with block 702 in which the computing system determines whether an interaction between a user/client and a contact center agent has been initiated and/or is currently occurring. For example, in some embodiments, the interaction may be an interaction initiated between a user and a contact center agent from the outset, whereas in other embodiments, the interaction may be an interaction that has been transferred from a chatbot to an agent (for example, as in block 622 of FIG. 6).

If the computing system determines that there is an interaction between the user and agent, the method 700 advances to block 704 in which the empathy AI system (e.g., the empathy AI system 322, 506) receives text of the interaction in real time. For example, as described above, the empathy AI system may coordinate with one or more other components of the computing system to retrieve and/or convert the interaction into text-based format (e.g., based on a unique interaction identifier of the contact center interaction). In particular, in block 706, the empathy AI system may receive one or more of the most recent user messages (e.g., the user messages to which an outstanding agent response is required). In other embodiments, the empathy AI system may receive the entire interaction transcript.

In block 708, the empathy AI system generates one or more empathy scores based on one or more user messages (e.g., the most recent user message(s)) of the interaction using machine learning. As described above, it should be appreciated that each of the empathy scores is indicative of a real-time empathy of the user. In particular, in block 710, the empathy AI system may determine a high level empathy of the user (e.g., and generate a corresponding high level empathy score). In block 712, the empathy AI system may determine a deep level empathy of the user (e.g., and generate a corresponding deep level empathy score). In block 714, the empathy AI system may determine a language style of the user (e.g., and generate a corresponding language style score). It should be appreciated that, in some embodiments, the empathy AI system may generate one or more aggregate empathy scores (e.g., based on the high level empathy score, the deep level empathy score, the language style score, and/or other empathy scores).

In block 716, the empathy AI system transmits the empathy score(s) to the agent device 110 of the contact center agent, for example, such that the score(s) may be displayed on a user interface for the agent to visualize the relevant empathy characteristics of the user/client in real time during the interaction. In other words, the empathy score(s) may serve as an objective indication of the user's empathy during the real-time interaction, which the agent can observe via a user interface and adjust agent responses accordingly (e.g., to further emphasize empathy with the user).

In block 718, the agent prepares a draft response to one or more of the previous user messages in real-time, which is sent to the empathy AI system. In block 720, the empathy AI system analyzes the draft response as described above (e.g., using a sequence-to-sequence AI model) and auto-suggests an empathetic agent response to the user message(s) based on the draft agent response, the empathy score(s), and/or other relevant characteristics. In other words, in some embodiments, the agent's draft text response may be analyzed in real time such that the agent is provided with one or more alternative, more empathetic, text reply recommendations nearly instantaneously.

In block 722, the contact center agent may reply to the user message(s) based on the auto-suggested empathetic agent response. For example, in block 724, the contact center agent may reply to the user with the auto-suggested empathetic response (i.e., replacing the agent's draft response with the auto-suggested empathetic response). In block 726, the contact center agent may opt to ignore the auto-suggested empathetic response and instead reply with the agent's original draft response. In block 728, the contact center agent may modify the agent's original draft response, for example, by emphasizing empathy such as in one or more ways similar to that of the auto-suggested empathetic response. The method 700 returns to block 706 in which the empathy AI system continues to receive text from the interaction in real time for analysis.

Although the blocks 702-728 are described in a relatively serial manner, it should be appreciated that various blocks of the method 700 may be performed in parallel in some embodiments.

Figure 9:
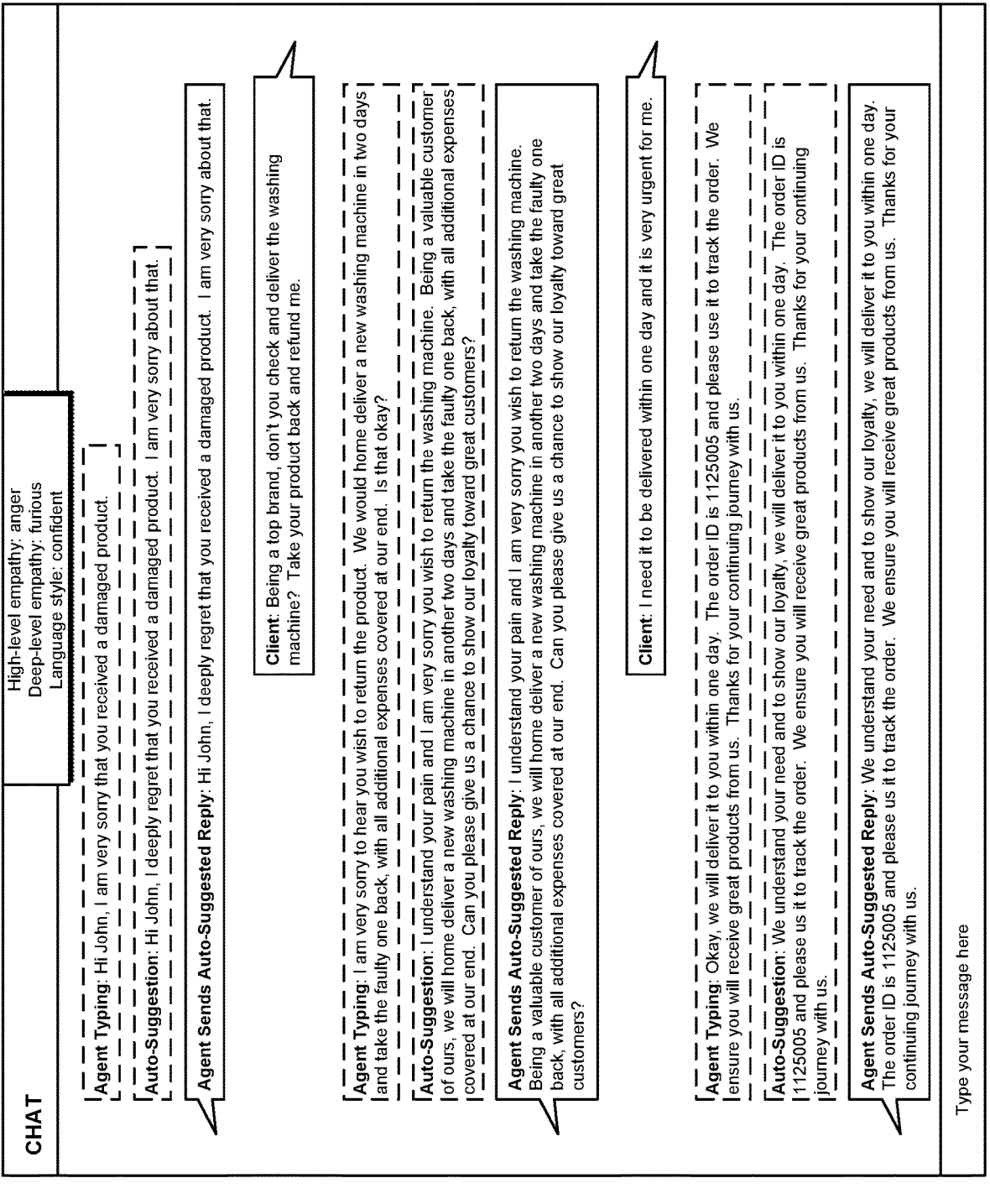
FIG. 9 is an example of an interaction between a client and an agent that leverages empathy predictions to generate auto-suggestions for the agent.

An example interaction between a user/client and a contact center agent that leverages empathy predictions is depicted in FIG. 9. Suppose a client has purchased a washing machine. The client has received a damaged product and is communicating with a contact center agent to address the issue (e.g., either at the outset or after having been routed to the agent following communications with a chatbot). During the interaction, the empathy AI system calculates the client's high level empathy, deep level empathy, and language style scores, and transmits those scores to the agent device 110 for display to the agent. Further suppose the client's high level empathy is "angry," the client's deep level empathy is "furious," and the clients language style is "confident." Based on those empathy characteristics, the agent may type a response to the client, for example, attempting to capture the appropriate level of empathy in the agent's response. Further, the empathy AI system may analyze the draft response in real time and auto-suggest a more empathetic reply based on the client's empathy traits. Accordingly, in the illustrative embodiment, the agent copies and sends the auto-suggested empathetic replies provided by the empathy AI system to the client (e.g., by clicking the respective auto-suggested reply on the user interface).

What is claimed is:

1. A method of leveraging machine learning to predict empathy for improved contact center interactions, the method comprising:

receiving, by a computing system, at least one user message from a real-time contact center interaction with a user between the user and a human contact center agent;

generating, by an artificial intelligence system of the computing system, at least one empathy score based on the at least one message using the machine learning, wherein each of the at least one empathy score is indicative of a real-time empathy of the user, and wherein generating the at least one empathy score based on the at least one message using the machine learning comprises:

determining a high level empathy category of the user selected from a first group of categories;

determining a deep level empathy category of the user selected from a second group of categories different from the first group of categories; and determining a language style category of the user selected from a third group of categories different from the first group of categories and the second group of categories;

receiving, by the computing system, a draft agent response to the at least one user message by the human contact center agent;

auto-suggesting, by the artificial intelligence system of the computing system, an empathetic agent response to the at least one user message based on the draft agent response and the at least one empathy score; and responding, via an agent device of the human contact center agent, to the at least one user message in the real-time contact center interaction based on the empathetic agent response auto-suggested by the artificial intelligence system of the computing system.

2. The method of claim 1, wherein determining the high level empathy category of the user comprises selecting a high level empathy category of the user from a group of high level empathy categories consisting of anger, joyfulness, optimism, and sadness.

3. The method of claim 1, wherein determining the deep level empathy category of the user comprises selecting a deep level empathy category of the user from a group of at least ten different categories of deep level empathies.

4. The method of claim 1, wherein determining the deep level empathy category of the user comprises selecting a deep level empathy category of the user from a group of deep level empathy categories consisting of sentimental, afraid, proud, faithful, terrified, jealous, grateful, prepared, embarrassed, excited, annoyed, lonely, ashamed, guilty, surprised, nostalgic, confident, furious, disappointed, caring, trusting, disgusted, anticipating, anxious, hopeful, impressed, apprehensive, and devastated.

5. The method of claim 1, wherein determining the language style category of the user comprises selecting a language style category of the user from a group of language style categories consisting of confident, analytical, and determinant.

6. A system for leveraging machine learning to predict empathy for improved contact center interactions, the system comprising:

at least one processor; and at least one memory comprising a plurality of instructions stored thereon that, in response to execution by the at least one processor, causes the system to:

receive at least one user message from a real-time contact center interaction with a user between the user and a human contact center agent;

generate, by an artificial intelligence system, at least one empathy score based on the at least one message using the machine learning, wherein each of the at least one empathy score is indicative of a real-time empathy of the user, and wherein to generate the at least one empathy score based on the at least one message using the machine learning comprises to:

determine a high level empathy category of the user selected from a first group of categories;

determine a deep level empathy category of the user selected from a second group of categories different from the first group of categories; and determine a language style category of the user selected from a third group of categories different from the first group of categories and the second group of categories;

receive a draft agent response to the at least one user message by the human contact center agent;

generate, by the artificial intelligence system, an empathetic agent response to the at least one user message based on the draft agent response and the at least one empathy score; and transmit the empathetic agent response to an agent device of the human contact center agent for empathetic reply to the at least one user message by the human contact center agent.

7. The system of claim 6, wherein to determine the high level empathy category of the user comprises to select a high level empathy category of the user from a group of high level empathy categories consisting of anger, joyfulness, optimism, and sadness.

8. The system of claim 6, wherein to determine the deep level empathy category of the user comprises to select a deep level empathy category of the user from a group of at least ten different categories of deep level empathies.

9. The system of claim 6, wherein to determine the language style category of the user comprises to select a language style category of the user from a group of language style categories consisting of confident, analytical, and determinant.

10. A method of leveraging machine learning to predict empathy for improved contact center interactions, the method comprising:

receiving, by a computing system, at least one user message from a real-time contact center interaction with a user between the user and a chatbot;

generating, by an artificial intelligence system of the computing system, at least one empathy score based on the at least one message using the machine learning, wherein each of the at least one empathy score is indicative of a real-time empathy of the user;

generating, by the artificial intelligence system of the computing system, an empathetic text response to the at least one user message based on the at least one empathy score;

transferring the real-time contact center interaction with the user to a human contact center agent;

notifying the artificial intelligence system of the computing system that the real-time contact center interaction is transferred to the human contact center agent; and transmitting the at least one empathy score to an agent device of the human contact center agent.

11. The method of claim 10, further comprising:

receiving, by the computing system, a draft agent response to the at least one user message by the human contact center agent;

auto-suggesting, by the artificial intelligence system of the computing system, an empathetic agent response to the at least one user message based on the draft agent response and the at least one empathy score; and responding, via the agent device of the human contact center agent, to the at least one user message in the real-time contact center interaction based on the empathetic agent response auto-suggested by the artificial intelligence system of the computing system.

12. The method of claim 11, further comprising displaying a set of reply options to the human contact center agent on a graphical user interface of the agent device, wherein the set of reply options includes a first option to respond to the at least one user message using the auto-suggested empathetic agent response and a second option to respond to the at least one user message using an alternative to the auto-suggested empathetic agent response.

13. The method of claim 12, wherein the alternative to the auto-suggested empathetic agent response comprises the draft agent response.

* * * * *